United States Patent Office 3,396,583
Patented Aug. 13, 1968

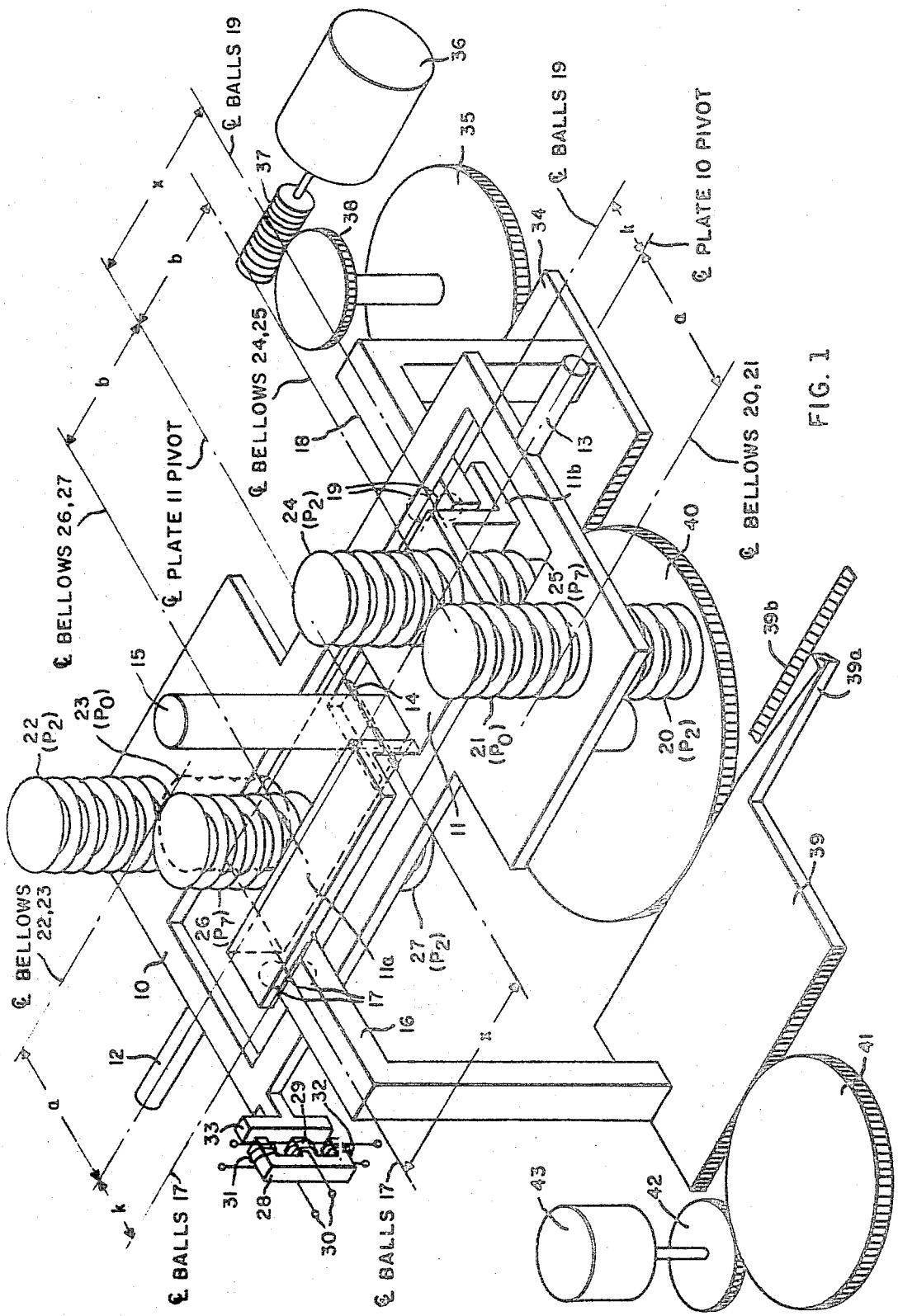

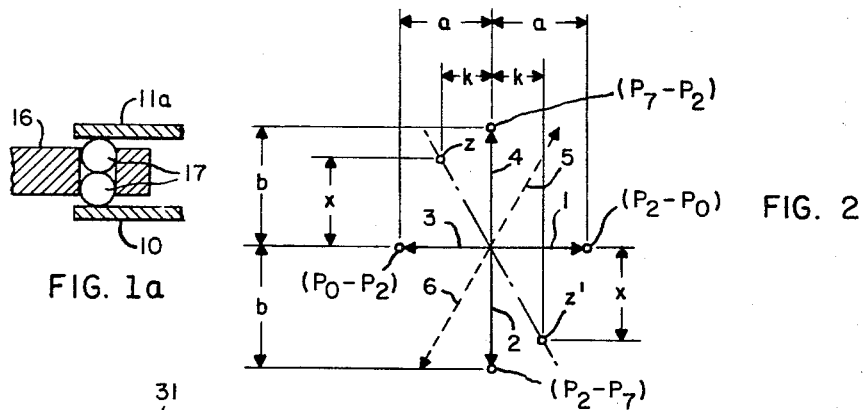
FIG. 1a
FIG. 2
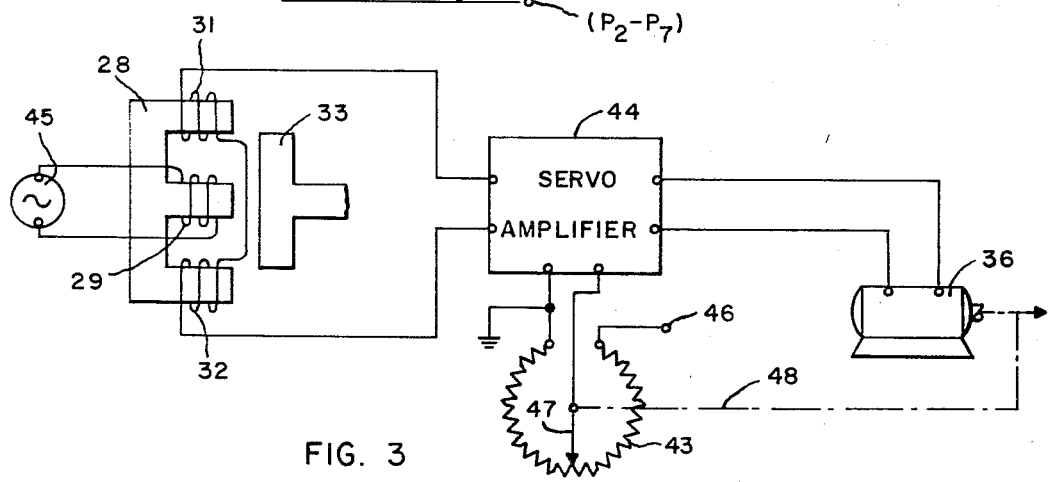
FIG. 3
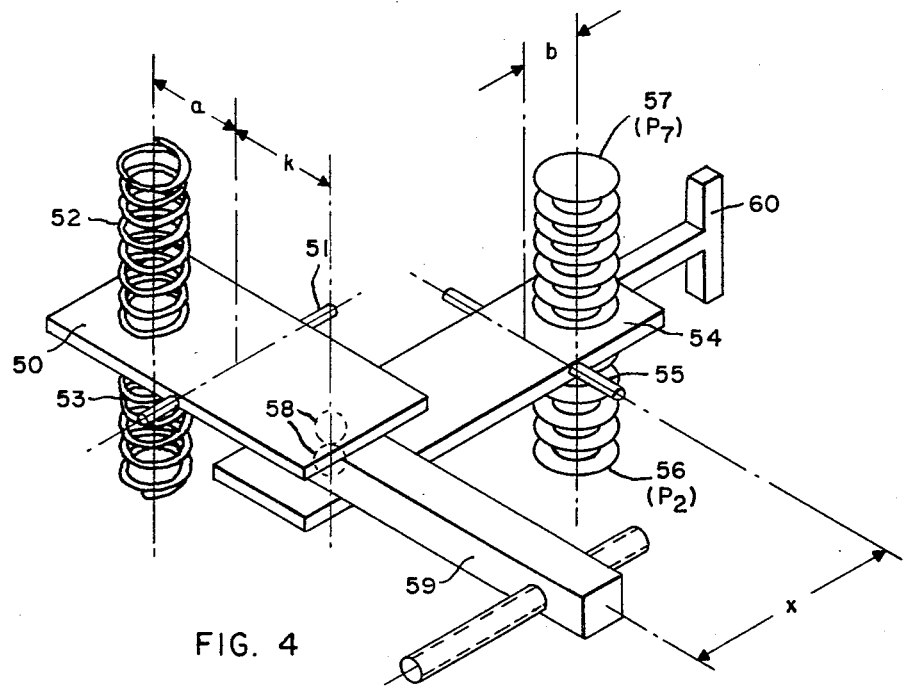
FIG. 4

3,396,583
DIFFERENTIAL FORCE-RATIO TRANSDUCER
Walter A. Hickox, Glen Cove, N.Y., assignor to Aeroflex
Laboratories Incorporated, a corporation of Delaware
Filed May 25, 1966, Ser. No. 552,762
9 Claims. (Cl. 73—407)

This invention relates to differential force-ratio transducers and, while it is of general application, it is particularly adapted for the measurement of the ratio of the inlet and exhaust pressures, of an internal combustion engine and will be specifically descrbied in such an application.

Heretofore there have been proposed and marketed a wide variety of force or pressure transducers. The preponderance of such devices have been what might be termed general-purpose devices capable of a wide variety of applications. Consequently, those devices have been relatively complex and costly. Moreover, the computing principle used in such devices has generally resulted in a nonlinear input-output characteristic which has required compensation or correction by electrical or mechanical devices. Such prior transducers also have generally included a number of moving parts which have been so disposed that the system geometry varied under the influence of the operational environment, causing calibration shifts, and have introduced appreciable friction, particularly static friction, which has impaired their accuracy.

It is an object of the invention, therefore, to provide a new and improved differential force-ratio transducer which obviates one or more of the above-mentioned disadvantages and limitations of prior devices of this type.

It is another object of the invention to provide a new and improved differential force-ratio transducer characterized by relative simplicity and ruggedness of construction, substantial freedom from moving parts and accompanying friction effects, particularly the effects of static friction, and one having a substantially linear input-output characteristic.

It is still another object of the invention to provide an improved force-balance transducer whose geometric analog remains fixed regardless of vibratory acceleration or variation of temperature environment imposed.

In accordance with the invention, there is provided a transducer for measuring the ratio of the differences of two pairs of forces comprising first and second pivoted members having their pivotal axes extending in directions at a substantial angle to each other, an antifriction interconnection between the pivoted members, means for differentially applying one of the two pairs of forces to the first member in a sense to bias it toward the second member at their point of interconnection, means for differentially applying the other of the two pairs of forces to the second member in a sense to oppose motion of the first member about its pivotal axis, and means responsive to pivotal movement of one of the two members for adjusting the interconnection therebetween in a sense to reduce pivotal movement of the two members substantially to zero. The term "difference of a pair of forces" is used herein and in the appended claims to include the situation in which at least one of the forces is constant and in the limit zero.

For a better understanding of the present invention, together with other and further objects thereof, reference is had to the following description, taken in connection with the accompanying drawings, while its scope will be pointed out in the appended claims.

Referring now to the drawings:

FIG. 1 is a perspective view, partly schematic, of a differential force-ratio transducer embodying the invention;

FIG. 1a is a fragmentary detail of the interconnection between two of the elements of FIG. 1;

FIG. 2 is a vector diagram to aid in explanation of the apparatus of FIG. 1;

FIG. 3 is a schematic circuit diagram of a servo-mechanism useful in association with the apparatus of FIG. 1, while FIG. 4 is a perspective schematic view of a modified and simplified form of the invention for measuring differential fluid pressure or absolute fluid pressure.

Referring now to FIG. 1 of the drawings, there is represented a transducer for measuring the ratio of the differences of two pairs of forces and, specifically, for measuring the ratio of the inlet pressure $P_2$ and the exhaust pressure $P_7$ of a turbine type internal combustion engine. This apparatus comprises a first pivoted member 10 and a second pivoted member 11, the two members having their pivotal axes extending in directions at a substantial angle to each other. For example, the member 10 is supported by flexural pivots 12, 13 fixedly mounted in a frame member, not shown, while member 11 is supported by a flexural pivot 14 secured in a frame member or post 15, the pivotal axes of the members 10 and 11 lying in a common plane and being substantially normal to each other. As shown, the member 10 includes a substantially central window, in which the member 11 is disposed, while the inner member 11 also includes a substantially central window through which the post 15 extends carrying the flexural pivot 14. The use of the flexural pivots 12, 13, 14 eliminates friction at the pivots, and particularly static friction, which is primarily troublesome in precision apparatus.

The transducer of FIG. 1 further comprises antifriction interconnections between the members 10 and 11. Specifically, an L-shaped member 16 has in its horizontal arm a vertical cylindrical bore or cage, as shown in FIG. 1a, in which are disposed two antifriction balls 17 which engage one side portion of the member 10 below the supporting member 16 and an offset flange 11a of the member 11 above the supporting member 16. The supporting member 16 is movable in a direction parallel to the pivotal axis of the member 10 and normal to the pivotal axis of the member 11, as described hereinafter, and the opposed surfaces of the member 10 and the flange 11a are provided with raceways of wear-resistant hardened steel (not shown) over which the two balls 17 travel. Preferably, and as illustrated, the apparatus comprises a pair of ball-and-cage assemblies symmetrically disposed on opposite sides of both pivotal axes. Specifically, there is provided a second movable support 18 having a horizontal arm having a vertical bore or cage in which are disposed two antifriction balls 19 which engage a hardened steel raceway on the under surface of the side portion of the member 10 and a second hardened steel raceway in the upper surface of a depending flange 11b of the member 11, the arrangement being similar to that shown in FIG. 1a.

The transducer of FIG. 1 further comprises means for differentially applying one of the pairs of forces to the first member 10, in a sense to bias it toward the second member 11 at the antifriction interconnection points, and means for differentially applying the other of said pairs of forces to the second member 11 in a sense to oppose motion of the first member about its pivotal axis. The means for differentially applying each of the pairs of forces to its respective member comprises a pair of force transducers, for example of the electromechanical, electromagnetic, or fluid types or the like, acting in opposite senses at corresponding points on opposed surfaces thereof. For example, there are provided a pair of opposed bellows, bellows 20 responsive to the inlet pressure $P_2$ and a vacuum bellows 21, acting at corresponding points on opposed surfaces of the member 10 and a second pair of opposed bellows, bellows 22 responding to the inlet pressure $P_2$ and a vacuum bellows 23, acting at corresponding points on opposed surfaces of a portion of the member 10 on opposite sides of the pivotal axes of both of the members 10 and 11.

Correspondingly, there are provided a pair of bellows, bellows 24 responsive to the inlet pressure $P_2$ and bellows 25 responsive to the exhaust pressure $P_7$, acting at corresponding points on opposed surfaces of the member 11 and a second pair of bellows, bellows 26 responsive to the exhaust pressure $P_7$ and bellows 27 responsive to the inlet pressure $P_2$, acting at corresponding points on opposed surfaces of the portion of the member 11 on opposite sides of the pivotal axes of both of the members 10 and 11.

Thus there are provided two means for differentially applying two pairs of forces to each of the members 10 and 11 symmetrically disposed on opposite sides of both pivotal axes. The end of each of the bellows opposite that affixed to one of the members 10, 11 is secured to the frame or housing, which has been omitted for the sake of clarity. Likewise, the fluid connections from the source of inlet pressure $P_2$ to the bellows 20, 22, 24, and 27 and the interconnections from the source of exhaust pressure $P_7$ to the bellows 25 and 26 have been omitted for the sake of clarity. The bellows 20–27, inclusive, are all of similar construction and performance characteristics and their arrangement is such that the net differential forces acting on both of the members 10 and 11 are such as to bias the members 10 and 11 into engagement at the antifriction interconnections formed by the balls 17 and 19.

The transducer of FIG. 1 further comprises means responsive to pivotal movement of one of the members 10, 11 for adjusting the antifriction interconnections between the members in a sense to reduce the pivotal movement of the members substantially to zero. This means is preferably in the form of a null-type electrical position sensor and a servomechanical controlled thereby for adjusting the ball pivot supporting members 16, 18 to null the sensor, the movement of the supporting members being representative of the ratio of the differences of the two pairs of forces. Specifically, in FIG. 1, the electrical sensor is in the form of an E-transformer 28 having an exciting winding 29 on the middle leg thereof adapted to be energized from input terminals 30. On the outer legs of the core 28 are disposed pickup windings 31 and 32. The core 28 is disposed adjacent an armature member 33 secured to the frame member 10.

The supporting member 18 is driven in a direction parallel to the pivotal axis of the member 10 and orthogonal to the pivotal axis of the member 11 by means of an elongated plate 34 having a gear rack on each edge thereof and driven by a pinion 35, in turn driven by a motor 36 through a worm 37 and worm wheel 38. A corresponding motion in the opposite sense is imparted to the supporting member 16 by means of an elongated plate 39, also having gear racks on opposed sides thereof, and driven by the member 34 through a reversing idler gear 40.

Each of the supporting members 16 and 18 is permitted limited vertical movement (as seen in FIG. 1) by the balls 17 or 19 sliding up and down in their cylindrical bores to permit incremental pivotal movements of the members 10 and 11 about their respective pivotal axes upon a temporary unbalance of the system. The member 39, through gearing 41, 42, also drives a potentiometer 43 for a purpose to be described. Extending from member 39 is an indicator arm 39a registering with a scale 39b for indicating the pressure ratio $P_7/P_2$, as described hereinafter.

To aid in an explanation of the operation of the apparatus of FIG. 1, the center lines of the pivotal axes of the members 10 and 11, as well as the lines joining the points of application of the differential forces to the members 10 and 11, and the lines constituting the locus of the points of the antifriction interconnections between the members 10 and 11 and the relative displacement between these lines are shown in the drawing. Thus, the bellows 20, 21 and 22, 23 act upon the member 10 at distances $a$ on opposite sides of its pivotal axis. Similarly, the bellows 24, 25 and 26, 27 act upon the member 11 at distances $b$ on either side of its pivotal axis. The points of interconnection between the members 10 and 11 by the antifriction balls 17 and 19 are displaced from the pivotal axis of the member 11 by the distances $x$ and from the pivotal axis of the member 10 by the distances $k$.

Referring now to FIG. 3, there is represented schematically a circuit diagram of the servomechanism for adjusting the supports 16, 18 in response to an angular movement of the members 10 and 11 about their respective pivotal axes from the neutral or equilibrium position in which they are substantially coplanar. Thus the pickup windings 31, 32 of the sensor 28 are connected in series to the input terminals of a servo-amplifier 44 while the exciting winding 29 is connected to a suitable source of alternating current 45, for example of 400 cycles. The output of the servo-amplifier 44 is connected to drive the motor 36 which, as shown in FIG. 1, adjusts the position of the antifriction interconnections between the members 10 and 11 in a direction parallel to the pivotal axis of the member 10. The potentiometer 43 is connected to a suitable bias source supplied to an input terminal 46 and is provided with an adjustable contact 47 connected to be adjusted by the motor 36 through a mechanism indicated schematically at 48. The portion of the potentiometer 43 between the contact 47 and ground is connected to serve as a bias to adjust the gain of the amplifier 44 for the purposes described hereinafter.

It is believed that an understanding of the operation of the transducer apparatus illustrated in FIGS. 1 and 3 and described above will be facilitated by reference to the vector force diagram of FIG. 2, in which the several dimensions corresponding to FIG. 1 are similarly identified. In FIG. 2, the vectors represent the following forces acting on the members 10 and 11:

Vector $1 = Aa(P_2 - P_0) =$ torque acting on member 10 due to the pairs of bellows 20, 21 and 22, 23

Vector $2 = Ab(P_7 - P_2) =$ torque acting on member 11 due to the bellows 24, 25 and 26, 27

Vectors 3 and 4 = reaction torques acting on members 10 and 11 at the ball interconnections and equal and opposite to vectors 1 and 2, respectively Vector 5 = resultant of torques 1 and 4 = torque acting on member 10

Vector 6 = resultant of torques 2 and 3 = torque acting on member 11 where $A =$ effective area of each of the bellows 20–27.

The force $F_e$ acting at point $z$ due to the differential force $(P_7 - P_2)$ is:

$$F_e = \frac{(P_7 - P_2)Ab}{x} \quad (1)$$

while the force acting at point $z$ due to the differential force $(P_2 - P_0)$ is:

$$F_i = \frac{(P_2 - P_0)Aa}{k} \quad (2)$$

At balance $$F_e = F_i \quad (3)$$

or $$\frac{(P_7 - P_2)Ab}{x} = \frac{(P_2 - P_0)Aa}{k} \quad (4)$$

or $$\frac{(P_7 - P_2)}{(P_2 - P_0)} = x \frac{a}{b \cdot k} \quad (5)$$

Since $P_0=0$, Equation 5 may be rewritten:

$$\frac{P_7}{P_2}=1+x\frac{a}{bk} \quad (6)$$

that is, the ratio $P_7/P_2$ varies linearly with $x$ so that $x$ is a representation of the desired pressure ratio $P_7/P_2$.

It is believed that the operation of the transducer and its associated apparatus, as illustrated in FIGS. 1 and 3, will be apparent from the foregoing description. In brief, it may be assumed that the various elements are in the relative positions shown in FIG. 1 in which the members 10 and 11 are essentially coplanar. If either or both of the inlet pressure $P_2$ or outlet pressure $P_7$ should vary under operating conditions, the system will tend to become unbalanced. For example, if it be assumed that the exhaust pressure $P_7$ should increase, then a resultant torque would be developed tending to move the member 11 counterclockwise about its pivot 14. Due to the interaction between the members 10 and 11 at the points of interconnection at the antifriction balls 17, 19, the member 10 will tend to move in a counterclockwise direction about its pivots 12, 13. Such a movement then unbalances the sensor 28, inducing a net potential in the windings 31, 32 which, via servo-amplifier 44, energizes the motor 36 to adjust the positions of the supporting members 16 and 18 in a direction parallel to the pivotal axis of the member 10 and in a sense to rebalance the resultant torques (Vectors 5 and 6, FIG. 2) and to restore the members 10 and 11 to their equilibrium coplanar positions. The movement of the members 34 and 39, as indicated on the scale 49, is thus a measure of the ratio of the forces $P_7/P_2$ as desired.

Since the response of the sensor 28 varies slightly with the displacement $x$ between the antifriction interconnection between the members 10 and 11 and the axis of the pivot 14, that is with the pressure ratio $P_7/P_2$, the gain of servo-amplifier 44 is adjusted by potentiometer 43 directly with the movement of the members 16 and 18, thereby tending to provide the sensor 28 with constant resolution or accuracy over the entire range of pressure ratios to which the apparatus responds.

In the event it is desired to measure a pressure difference rather than the ratio of two pressure differences, the apparatus of FIG. 1 may be somewhat simplified, as represented in FIG. 4. For the sake of simplicity, the apparatus of FIG. 4 has been shown as of the unsymmetrical type rather than the symmetrical type as in FIG. 1, that is, with force-exerting devices acting on each pivoted member on only one side of its pivotal axis. Referring to FIG. 4, there is shown schematically a first member 50 mounted on a flexural pivot 51 together with a pair of springs 52, 53 acting at corresponding points on opposed surfaces of the member 50 and applying a pair of substantially constant and opposed forces to the member 50. A second member 54, mounted on a flexural pivot 55, is acted upon by a pair of bellows, specifically a bellows 56 responsive to the inlet pressure $P_2$ and a bellows 57 responsive to the exhaust pressure $P_7$ and acting at corresponding points on opposed surfaces of the member 54. The members 50 and 54 are provided with an antifriction interconnection including a pair of antifriction balls 58 disposed in a vertical bore or cage in a horizontal supporting member 59 and engaging opposed surfaces of the members 50 and 54. The supporting member 59 is movable either in a direction parallel to the axis of the pivot 51 or in a direction parallel to the axis of the pivot 55 by any conventional mechanism, not shown. Attached to the member 54 is a magnetic armature 60 adapted to cooperate with an electrical sensor such as the sensor 28 of FIG. 1. It will be understood that the servomechanism for adjusting the supporting member 59 in response to an unbalance of the system in which the members 50 and 54 deviate from a parallel plane relationship may be that shown in FIG. 3.

The operation of the transducer of FIG. 4 is governed by the same principles as that of FIG. 1. If $F_s$ is the constant differential spring load exerted by the springs 52, 53 on the member 50 and $F_1$ the reaction force at the antifriction connection 58, then $$F_s a = F_1 k \quad (7)$$

Further, as in FIG. 1:

$$F_e = \frac{(P_7 - P_2)Ab}{x} \quad (1)$$

When the system is balanced, $F_e = F_1$ and $$\frac{(P_7 - P_2)Ab}{x} = \frac{F_s a}{k} \quad (8)$$

or $$P_7 - P_2 = \frac{F_s a}{k} \cdot \frac{x}{Ab} \quad (9)$$

That is, the pressure difference between the inlet pressure $P_2$ and the exhaust pressure $P_7$ varies linearly with the displacement $x$ of the supporting member 59.

If it is desired that the transducer respond only to an absolute pressure, for example the exhaust pressure $P_7$, then the bellows 56 may be replaced by an evacuated bellows so that $P_2 = 0$ and $$P_7 = \frac{F_s a}{k} \cdot \frac{x}{Ab} \quad (10)$$

It is thus seen that the differential force-ratio transducer of the invention has a number of distinct advantages as follows:

(1) A minimum friction due to the use of flexural pivots and the absence of any moving parts other than the antifriction balls interconnecting the two members.

(2) A minimum temperature coefficient by virtue of the symmetrical construction. This result may also be facilitated by constructing all of the main members of the same material or of materials which have a mutually compensating effect in the symmetrical system.

(3) A linear measurement of pressure ratio or differential pressure or absolute pressure is obtained directly and without the necessity of linearity-correction devices.

(4) Because of the symmetrical configuration, as in the apparatus of FIG. 1, the mass is balanced about the pivotal axes, thus rendering the apparatus relatively rigid and insensitive to dynamic forces on the apparatus.

(5) The indicated measurement is independent of the spring rates or areas of the force-developing bellows.

(6) Since all of the bellows of the apparatus of FIG. 1 have the same effective area, the torques generated thereby and acting on the members are independent of surrounding or ambient pressure.

(7) The symmetrical arrangement of the eight bellows in the apparatus of FIG. 1 substantially eliminates radial loads on the pivots of the plate members, thereby avoiding pivot deformations and load-related friction characteristics.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A transducer for measuring the ratio of the differences of two pairs of forces comprising:

first and second pivoted members having their pivotal axes extending in directions at a substantial angle to each other;

an antifriction interconnection between said members;

means for differentially applying one of said pairs of forces to said first member in a sense to bias it toward said second member at said interconnection;

means for differentially applying the other of said pairs of forces to said second member in a sense to oppose motion of said first member about its pivotal axis;

and means responsive to pivotal movement of one of said members for adjusting said interconnection in a sense to reduce pivotal movement of said members substantially to zero.

2. A differential force-ratio transducer in accordance with claim 1 in which the pivotal axes of said members lie in a common plane and in planes substantially normal to each other.

3. A differential force-ratio transducer in accordance with claim 1 in which one of said members includes a substantially central window in which the other member is disposed.

4. A differential force-ratio transducer in accordance with claim 3 in which the inner member includes a substantially central window through which extends a frame member carrying pivots therefor.

5. A differential force-ratio transducer in accordance with claim 1 in which the antifriction interconnection between said members includes a pair of ball-and-cage assemblies symmetrically disposed on opposite sides of both pivotal axes.

6. A differential force-ratio transducer in accordance with claim 1 in which the two means for differentially applying said pairs of forces to their respective members are symmetrically disposed on opposite sides of both pivotal axes.

7. A transducer in accordance with claim 1 for measuring the ratio of the inlet and exhaust fluid pressures of a turbine type internal combustion engine which comprises an evacuated bellows and a bellows responsive to inlet pressure for developing and applying a first pair of forces to one of said members and a pair of bellows individually responsive to inlet pressure and exhaust pressure for developing and applying the second pair of forces to the other of said members.

8. A transducer in accordance with claim 1 for measuring the difference of the inlet and exhaust fluid pressures of a turbine type internal combustion engine which comprises a pair of springs for developing and applying a first pair of substantially constant forces to one of said members and a pair of bellows individually responsive to inlet pressure and exhaust pressure for developing and applying the second pair of forces to the other of said members.

9. A transducer in accordance with claim 1 for measuring a fluid pressure which comprises a pair of springs for developing and applying a first pair of substantially constant forces to one of said members and a pair of bellows, one evacuated and the other responsive to said fluid pressure for developing and applying the second pair of forces to the other of said members.

References Cited

UNITED STATES PATENTS

| | | | |
|---|---|---|---|
| 2,599,288 | 6/1952 | Schaefer | 73—182 |
| 2,895,333 | 7/1959 | Hazen | 73—182 |
| 2,937,528 | 5/1960 | Ketchum | 73—182 |
| 2,940,316 | 6/1960 | Carey | 73—182 |
| 3,045,500 | 7/1962 | Bruun | 73—182 |
| 3,285,071 | 11/1966 | Plunk | 73—182 |

DAVID SCHONBERG, *Primary Examiner.*

DENIS E. CORR, *Assistant Examiner.*